United States Patent
Kang et al.

(10) Patent No.: US 8,189,462 B2
(45) Date of Patent: May 29, 2012

(54) METHOD OF ADJUSTING PCS THRESHOLD AND TERMINAL APPARATUS FOR HIGH DENSITY WIRELESS NETWORK

(75) Inventors: Hyunduk Kang, Daejeon (KR); Heon Jin Hong, Daejeon (KR); Hyuk Lim, Gwangju (KR); Kwanhee Jeong, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 121 days.

(21) Appl. No.: 12/495,549

(22) Filed: Jun. 30, 2009

(65) Prior Publication Data

US 2010/0008226 A1 Jan. 14, 2010

(30) Foreign Application Priority Data

Jul. 9, 2008 (KR) .................. 10-2008-0066727

(51) Int. Cl.
*H04J 1/16* (2006.01)
(52) U.S. Cl. ........................ 370/229; 370/252
(58) Field of Classification Search .................. 370/229, 370/389, 349, 345, 235.1, 231, 234, 232, 370/233, 252
See application file for complete search history.

(56) References Cited

U.S. PATENT DOCUMENTS

| | | | |
|---|---|---|---|
| 5,721,733 A | 2/1998 | Wang et al. | |
| 7,463,644 B2 * | 12/2008 | Zhu et al. | 370/445 |
| 2005/0129051 A1 | 6/2005 | Zhu et al. | |
| 2007/0060155 A1 | 3/2007 | Kahana et al. | |
| 2007/0214247 A1 | 9/2007 | Yang et al. | |

FOREIGN PATENT DOCUMENTS

| | | |
|---|---|---|
| JP | 2008042383 A | 2/2008 |
| KR | 2007-0057089 | 6/2007 |

OTHER PUBLICATIONS

J. Zhu et al., "Adaptive CSMA for Scalable Network Capacity in High-Density WLAN: A Hardware Prototyping Approach", INFOCOM 2006. 25th IEEE International Conference on Computer Communications. Proceedings, Apr. 2006.

* cited by examiner

*Primary Examiner* — Brenda H Pham
(74) *Attorney, Agent, or Firm* — Rabin & Berdo, P.C.

(57) ABSTRACT

Provided are a method of adjusting a PCS threshold in a wireless network, and a terminal apparatus for the wireless network. The method and the apparatus determines whether to adjust the PCS threshold to use a shared channel for transmitting data in a wireless network based on a congestion status of the shared channel, and adjusts the PCS threshold based on a packet loss measured for a predetermined period of time.

12 Claims, 4 Drawing Sheets

FIG. 7

```
Reset timer t
while t < T do
        τ_i ← τ_i + cntPause / cw_
        if node i transmits then
                NT_i ← NT_i + 1
                if transmission fails then
                        NF_i ← NF_i + 1
                end if
        end if
end while
```

FIG. 8

```
if Δτ_i ≤ α τ_th then
        if q_i > ((1 + w) * q_th) then
                // P_c: PCS threshold
                P_c ← P_c - δ
        else
                if q_i < ((1 - w) * q_th) then
                        P_c ← P_c + δ
                end if
        end if
else
        P_c ← P_c
```

METHOD OF ADJUSTING PCS THRESHOLD AND TERMINAL APPARATUS FOR HIGH DENSITY WIRELESS NETWORK

CROSS-REFERENCE TO RELATED PATENT APPLICATION

This application claims the benefit of Korean Patent Application No. 10-2008-0066727, filed on Jul. 9, 2008, in the Korean Intellectual Property Office, the disclosure of which is incorporated herein in its entirety by reference.

BACKGROUND OF THE INVENTION

1. Field of the Invention

The present invention relates to a terminal apparatus for a wireless network and a method of adjusting a physical carrier sensing (PCS) threshold in the wireless network, and more particularly, to a method of removing an interference signal or obtaining a spatial division multiple access (SDMA) effect by virtually applying multiple antennae to an orthogonal frequency division multiplexing (OFDM) system and an OFDM based cellular system.

2. Description of the Related Art

A wireless mesh network is a communications network made up of a plurality of wireless nodes that are connected to each other using ad-hoc networks, instead of using fixed wired networks, and reciprocally operate. A network service may be provided in a wide range of areas using the ad-hoc networks, which are constituted by connecting wireless devices based on a net-like structure, as a backbone.

Using the wireless mesh network, the high installation and management costs required when conventional wired and wireless networks are constructed may be reduced and the networks may have scalability, reliability, and mobility. In addition, a variety of networks such as ac-hoc networks, cellular networks, and wireless sensor networks may be combined to provide a network in a wide range of areas.

In spite of these advantages, the wireless mesh network has a lower throughput as compared to that of the conventional wired networks. That is, since air is a communication medium in a wireless network including the wireless mesh network, the wireless network may be affected by interference caused by peripheral nodes and may not send or receive stable and reliable packets.

In order to solve such disadvantages of the wireless networks, a system for and method of selecting a data rate in a wireless network is reported in Korean Patent Publication No. 2007-0057089. Here, a dynamic adjustment scheme is performed so as to quickly adapt to channel variation characteristics, where adjustment values depend on the target packet completion rates that maximize the effective throughput. In addition, a single effective throughput computation that includes both successful and unsuccessful transmissions is considered to compute the overall message delay. An objective function considering the waiting time between retransmissions and depending on the MAC protocol is used. As a result, the performance of wireless systems may be improved using the dynamic adjustment scheme that can quickly adapt to channel variation characteristics by considering the effect of the data rate selection.

A physical carrier sensing (PCS) mechanism is also introduced according to the IEEE 802.11 MAC/PHY protocol in order to reduce the interference of signals and effectively transmit packets in wireless networks.

According to the PCS mechanism, a sender node determines whether a channel is in use based on signals (interference and noise generated by peripheral nodes) received by the sender node before transmitting data. In the PCS mechanism, a PCS threshold provides a reference for determining an idle state. When the size of a signal received by the sender node is less than a predetermined threshold, the state is determined as an idle state.

However, the PCS threshold is not standardized by the IEEE 802.11 MAC/PHY protocol. In particular, a fixed PCS threshold is used in conventional wireless network systems. But an inappropriate PCS threshold may decrease the performance of a wireless network. An appropriate PCS threshold is essential to decrease the possibility of packet collisions, maximize the capability of space reuse, and improve the performance of the wireless network.

The adjustment mechanism for setting an appropriate PCS threshold is classified into a signal to interference and noise ratio (SINR)-based mechanism and a packet loss-based mechanism.

In the SINR-based mechanism, a sender node needs to receive continuous SINR feedback from a receiver node to obtain a SINR value based on the status of a channel. This mechanism is difficult to be implemented, and also the appropriate PCS threshold may not be maintained if there is a low packet loss.

On the other hand, the packet loss-based mechanism, as a sender node-based mechanism, may be designed without the additions of further feedback. That is, the amount of overhead due to feedback may be reduced. However, the cause of the packet loss has not been accurately determined. That is, it is difficult to determine whether the packet loss is caused by interference between nodes or channel congestion.

SUMMARY OF THE INVENTION

The present invention provides a terminal apparatus for a wireless network so as to improve the performance of the entire wireless network by maximizing space use in consideration of the interference due to peripheral nodes in the wireless network and by inhibiting an insignificant PCS threshold adjustment by detecting the cause of packet loss, and a method of adjusting a PCS threshold.

According to an aspect of the present invention, there is provided a terminal apparatus for a wireless network comprising: an adjustment determining unit which determines whether to adjust a PCS threshold, which is a reference for determining whether a shared channel for transmitting data in a wireless network is in an idle state available for use, based on a congestion status of the shared channel; a PCS threshold adjusting unit which adjusts the PCS threshold based on a packet loss measured for a predetermined period of time; a channel state detecting unit which determines whether the shared channel is an idle state for transmitting data based on the size of a signal received from the wireless network and the PCS threshold; and a data transmitting unit which transmits data when the shared channel is in an idle state.

According to another aspect of the present invention, there is provided a method of adjusting a physical carrier sensing (PCS) threshold in a wireless network, the method comprising: determining whether to adjust the PCS threshold, which is a reference for determining whether a shared channel for transmitting data in a wireless network is in an idle state for use, based on a congestion status of the shared channel; and adjusting the PCS threshold based on a packet loss measured for a predetermined period of time.

BRIEF DESCRIPTION OF THE DRAWINGS

The above and other features and advantages of the present invention will become more apparent by describing in detail exemplary embodiments thereof with reference to the attached drawings in which:

FIG. 7 is an algorithm that collects information for a predetermined period of time and measures a congestion status of a shared channel and a packet loss, according to an embodiment of the present invention; and FIG. 8 is an algorithm that adjusts a PCS threshold based on a congestion status of a shared channel and a packet loss in operations shown in FIG. 6, according to an embodiment of the present invention.

DETAILED DESCRIPTION OF THE INVENTION

Figure 1:
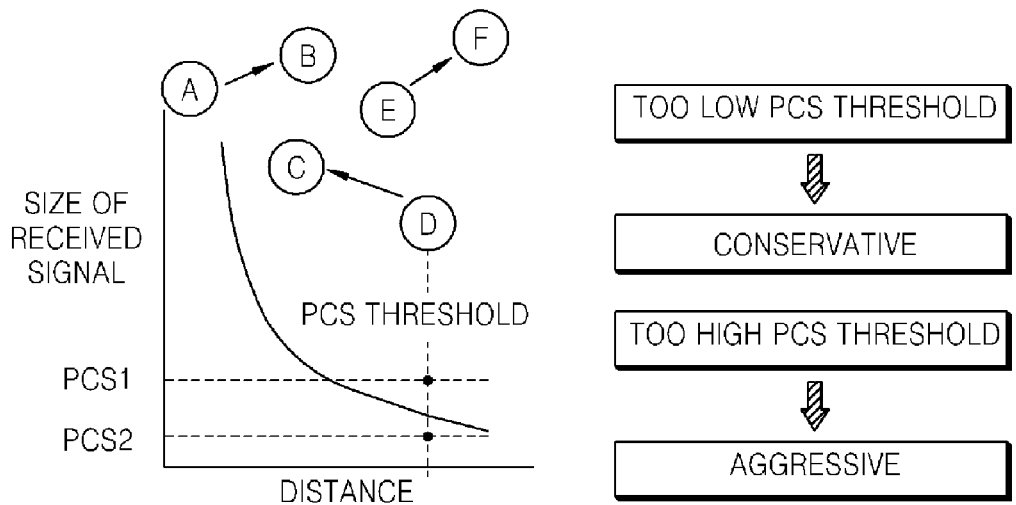
FIG. 1 shows a typical physical carrier sensing (PCS) mechanism.

The principle of the present invention is exemplified. Therefore, one skilled in the art can invent various apparatuses that implement the principle of the present invention and are included in the concept and range of the present invention, although the apparatuses are not described in detail and illustrated in the specification. In addition, it should be noted that all conditional terms and embodiments provided in the specification are intended only for the purpose of providing a sufficient understanding of the present invention and are not limited to embodiments and states provided in the specification. In addition, all the descriptions providing particular embodiments, in addition to the principles, aspects, and embodiments of the present invention, are intended to include structural and functional equivalents. In addition, the equivalents include equivalents that will be developed, that is, any device invented to perform the same function regardless of a structure, in addition to published equivalents.

Therefore, functions of various units illustrated in the drawings such as processors or function blocks displayed to have similar concepts may be used for dedicated hardware and hardware capable of executing associated software. When the functions are provided by the processors, the functions may be provided by a single dedicated processor, a single shared processor, or a plurality of individual processors, and parts of those may be shared. In addition, the use of terms such as processors, controls, or terms introduced to have similar concepts may not be construed to exclude hardware capable of executing associated software; rather, the use thereof implicitly includes the use of digital signal processors (DSP) hardware, read-only memory (ROM), random-access memory (RAM), and a non-volatile memory for storing the software. Other hardware in old combinations may be included.

Exemplary embodiments of the present invention will now be described in detail with reference to the accompanying drawings. In the description, the detailed descriptions of well-known functions and structures may be omitted so as not to hinder the understanding of the present invention. Hereinafter, the present invention will be described more fully with reference to the accompanying drawings, in which exemplary embodiments of the invention are shown.

The IEEE 802.11 DCF (distributed coordination function) mechanism is a contention-based channel access protocol in which all devices in a network contend with each other to use a shared channel based on carrier sensing multiple access with collision avoidance (CSMA/CA) mechanism that basically uses a physical carrier sensing (PCS) mechanism.

When a packet needs to be transmitted in the PCS mechanism, a PCS threshold provides a reference for determining whether a wireless channel is in use. If the size of a received signal is greater than a predetermined threshold, it is determined that the wireless channel is in use, and thus, another transmission between nodes is inhibited.

FIG. 1 shows a typical physical carrier sensing (PCS) mechanism.

Referring to FIG. 1, if a PCS threshold is too low, the number of nodes available for simultaneously transmitting packets in a single wireless medium space is relatively decreased, and thus, the capacity of the network is decreased. On the other hand, if a PCS threshold is too high, the number of nodes available for simultaneously transmitting packets in the single wireless medium space is relatively increased, but one transmission between nodes may cause noise, thereby interfering another transmission between nodes.

Thus, the PCS threshold in a sender node determines the number of links available for simultaneous transmissions and ultimately affects determining the total capacity of the wireless mesh network, where the capacity of the wireless mesh network determines space reuse, and thus, is related to the improvement of the total capacity of the network.

The present invention provides a terminal apparatus for a wireless network and a method of adjusting a PCS threshold according to the conditions of a network based on packet loss.

Figure 2:
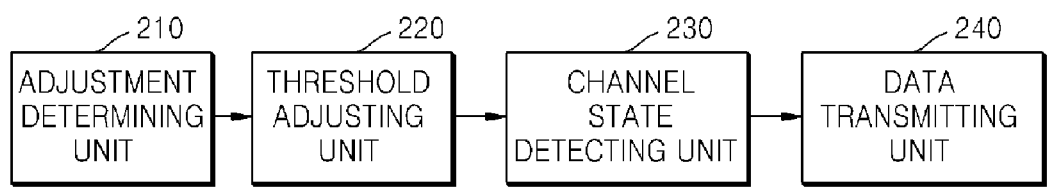
FIG. 2 is a block diagram illustrating a terminal apparatus for a wireless network, according to an embodiment of the present invention.

FIG. 2 is a block diagram illustrating a terminal apparatus for a wireless network, according to an embodiment of the present invention.

Referring to FIG. 2, the terminal apparatus for a wireless network includes an adjustment determining unit 210, a threshold adjusting unit 220, a channel state detecting unit 230 and a data transmitting unit 240.

The adjustment determining unit 210 determines whether to adjust a PCS threshold based on a congestion status of a shared channel for transmitting data in a wireless network.

In this regard, the congestion status of the shared channel may be measured by a busy slots ratio generated when the shared channel is not in an idle state. Also, the idle state for transmitting data is determined before transmitting data.

According to the current embodiment, if the measured congestion status of the shared channel is greater than a predetermined reference congestion status of the shared channel, the adjustment determining unit 210 determines to adjust the threshold. Otherwise, if the measured congestion status of the shared channel is less than the predetermined reference congestion status of the shared channel, the adjustment determining unit 210 determines not to adjust the threshold.

The threshold adjusting unit 220 adjusts the PCS threshold based on a packet loss Loss measured for a predetermined period of time in response to the determination of the adjustment determining unit 210.

In this regard, the packet loss Loss is calculated by measuring the total number of packet transmission attempts and the total number of packet transmission failures for a predetermined period of time.

The PCS threshold adjusting unit 220 has a mechanism of adjusting the PCS threshold according to the conditions of the wireless network based on the packet loss Loss.

The threshold adjusting unit 220 decreases the PCS threshold if the packet loss Loss is equal to or greater than a predetermined packet loss reference $Loss_{req}$, and increases the PCS threshold if the packet loss Loss is less than the predetermined packet loss reference $Loss_{req}$.

That is, the threshold adjusting unit 220 has a mechanism of adjusting the PCS threshold according to the conditions of the wireless network based on the packet loss Loss.

The channel state detecting unit 230 determines whether the shared channel is in an idle state for data transmission, based on the size of a received signal in a wireless network and the PCS threshold.

The channel state detecting unit 230 determines that the shared channel is in an idle state if the size of a received signal is less than the PCS threshold, and determines that the shared channel is not in an idle state if the size of the received signal is greater than the PCS threshold.

In this regard, the received signal includes interference and noise generated by peripheral nodes, and also all signals received by a sender node.

The data transmitting unit 240 transmits data when the shared channel is in an idle state as determined by the channel state detecting unit 230.

That is, in the current embodiment, the congestion of the shared channel is determined based on a busy slot ratio. In a backoff mechanism of a MAC system of wireless networks, if the channel is congested, the sender node has an increased busy slot ratio when transmitting a single data.

A sender node, in which the measured busy slot ratio is greater than a predetermined busy slot ratio, is not adjusted, does not adjust the PCS threshold because nodes, in which channel congestions are generated, are more likely provide a lot of interferences to peripheral nodes, rather than having benefits when the PCS threshold is adjusted, thereby decreasing the capability of space reuse. Thus, an overall throughput of a wireless network in a topology in which channel congestions are frequently generated may be significantly improved.

Figure 3:
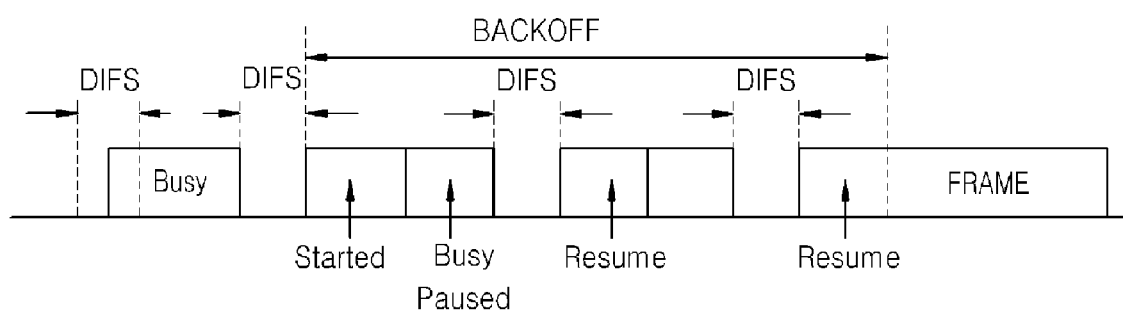
FIG. 3 shows a process of measuring a congestion status of a shared channel using a busy slot ratio in a terminal apparatus for a wireless network, according to an embodiment of the present invention.

FIG. 3 shows a process of measuring a congestion status of a shared channel using a busy slot ratio in a terminal apparatus for a wireless network, according to an embodiment of the present invention.

Referring to FIG. 3, according to the IEEE 802.11 DCF mechanism, a sender node having packets to be sent monitors a shared channel in order to determine whether data may be transmitted during a distributed inter frame space (DIFS). If the shared channel is in an idle state, a random value is selected between 0 and cw_ (current contention window size), and then a backoff timer is started (Started state). The time taken while the backoff timer operates refers to a backoff period. During the backoff period, data transmission of the sender node may be delayed due to a large number of contention nodes in the wireless network. That is, the state of the shared channel is changed to a backoff busy (paused) state if another contention node in the PCS range transmits data during the backoff period, i.e., if the state of a wireless medium is not in an idle state. Then, if the shared channel is in an idle state, as a result of monitoring the shared channel during the DIFS, the state of the shared channel is changed to a backoff resumed state. As described above, if there are a lot of sender nodes in a predetermined area, the backoff busy/resume state is frequently repeated, and thus, the shared channel is in a congestion state. Thus, each of the sender nodes detects congestion of the shared channel by measuring an average busy slot ratio during the backoff period when the sender node transmits data.

Figure 4:
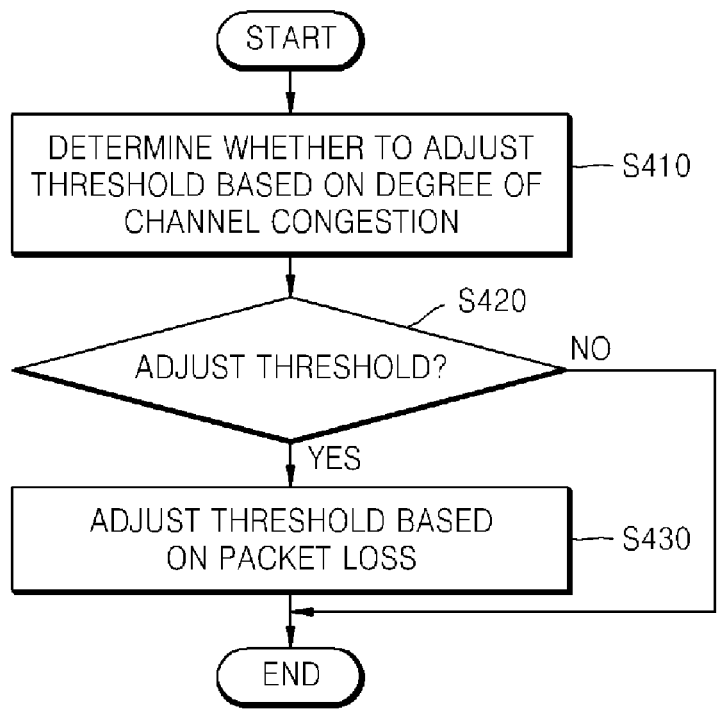
FIG. 4 is a flowchart illustrating a method of adjusting a PCS threshold of a wireless network, according to an embodiment of the present invention.

FIG. 4 is a flowchart illustrating a method of adjusting a PCS threshold of a wireless network, according to an embodiment of the present invention. Referring to FIG. 4, the method is processed in the terminal apparatus for a wireless network shown in FIG. 2 in a time-series manner. Thus, even though not described herein, the features with regard to the terminal apparatus for a wireless network shown in FIG. 2 are also applied to the method of adjusting a PCS threshold according to the present invention.

First, a congestion status of the shared channel for transmitting data in a wireless network is measured, and a PCS threshold adjustment with regard to use of the shared channel is determined based on the measured congestion status of the shared channel (S410).

Figure 5:
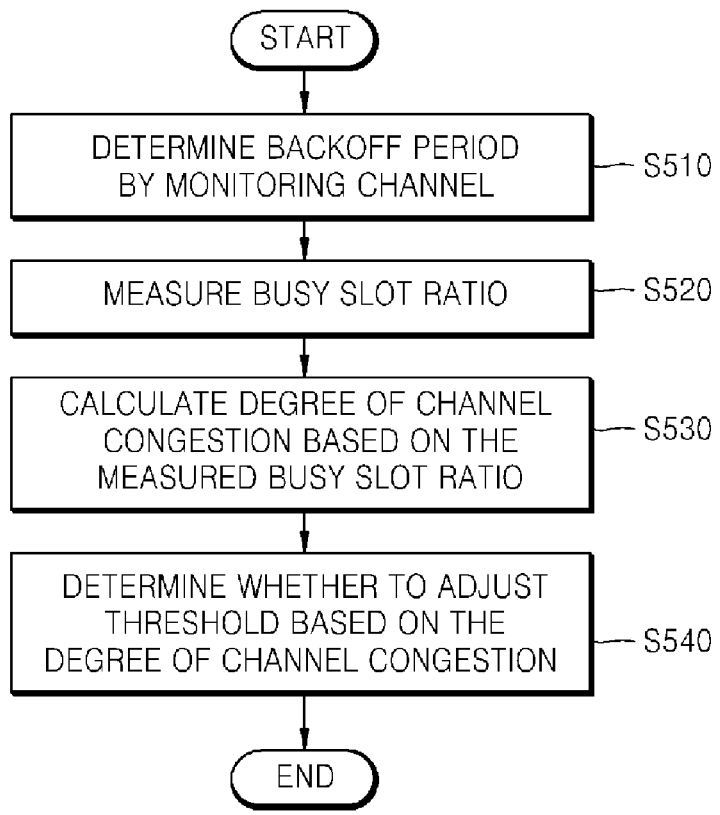
FIG. 5 is a flowchart specifically illustrating a process of determining a PCS threshold adjustment.

FIG. 5 is a flowchart specifically illustrating the process of determining a PCS threshold adjustment (S410).

Referring to FIG. 5, a backoff period is randomly determined within a contention window size when a shared channel is in an idle state, by monitoring the shared channel (S510).

A ratio of busy slots, generated when the state of the shared channel is changed from the idle state to a non-idle state during the determined backoff period, is measured (S520).

A congestion status of the shared channel is calculated based on the measured busy slot ratio (S530).

The PCS threshold adjustment is determined based on the calculated congestion status of the shared channel (S540). That is, if the calculated congestion status of the shared channel is greater than a predetermined reference congestion status of the shared channel, the PCS threshold is adjusted. On the other hand, if the calculated congestion status of the shared channel is less than the predetermined reference congestion status of the shared channel, the PCS threshold is not adjusted.

Then, if it is determined that the PCS threshold is adjusted in operation S410 (S420), the PCS threshold is adjusted based on a packet loss measured for a predetermined period of time (S430).

First, a time period T for adjusting the PCS threshold is determined. Information such as a number of current busy slots (cntPause), a current contention window size (cw_), and a number of transmission attempts (allCnt) is collected in order to calculate a packet loss ($q_i$) and an average busy slot ratio ($A_{T_i}$) of each of the sender nodes for the time period T.

Here, the packet loss $q_i$ of each of the sender nodes may be calculated using Equation 1.

$$q_i = NF_i/NT_i \qquad \text{Equation 1}$$

Here, $NF_i$ is the total number of packet collisions, and $NT_i$ is the total number of packet transmission attempts.

In addition, the average busy slot ratio $A_{T_i}$ of each of the sender nodes may be calculated using Equation 2.

$$A_{T_i} = \tau_i/\text{allCnt} \qquad \text{Equation 2}$$

Here, $\tau_i$ is a number of busy slots per contention window size, and allCnt is the number of transmission attempts.

As shown in FIG. 3, the backoff busy/resume may be repeated during the backoff period. The number of current busy slots (cntPause may be measured using a method of increasing the number of busy slots by one, whenever the backoff busy/resume is repeated during the backoff period.

The time period T for collecting information in order to adjust the PCS threshold may determine the time for convergence of an algorithm for the PCS threshold adjustment mechanism. However, if the time period T is too short for a quick convergence, the PCS threshold may not be accurately adjusted due to inaccurate packet loss. Thus, the time period T needs to be sufficiently long to measure the packet loss.

Figure 6:
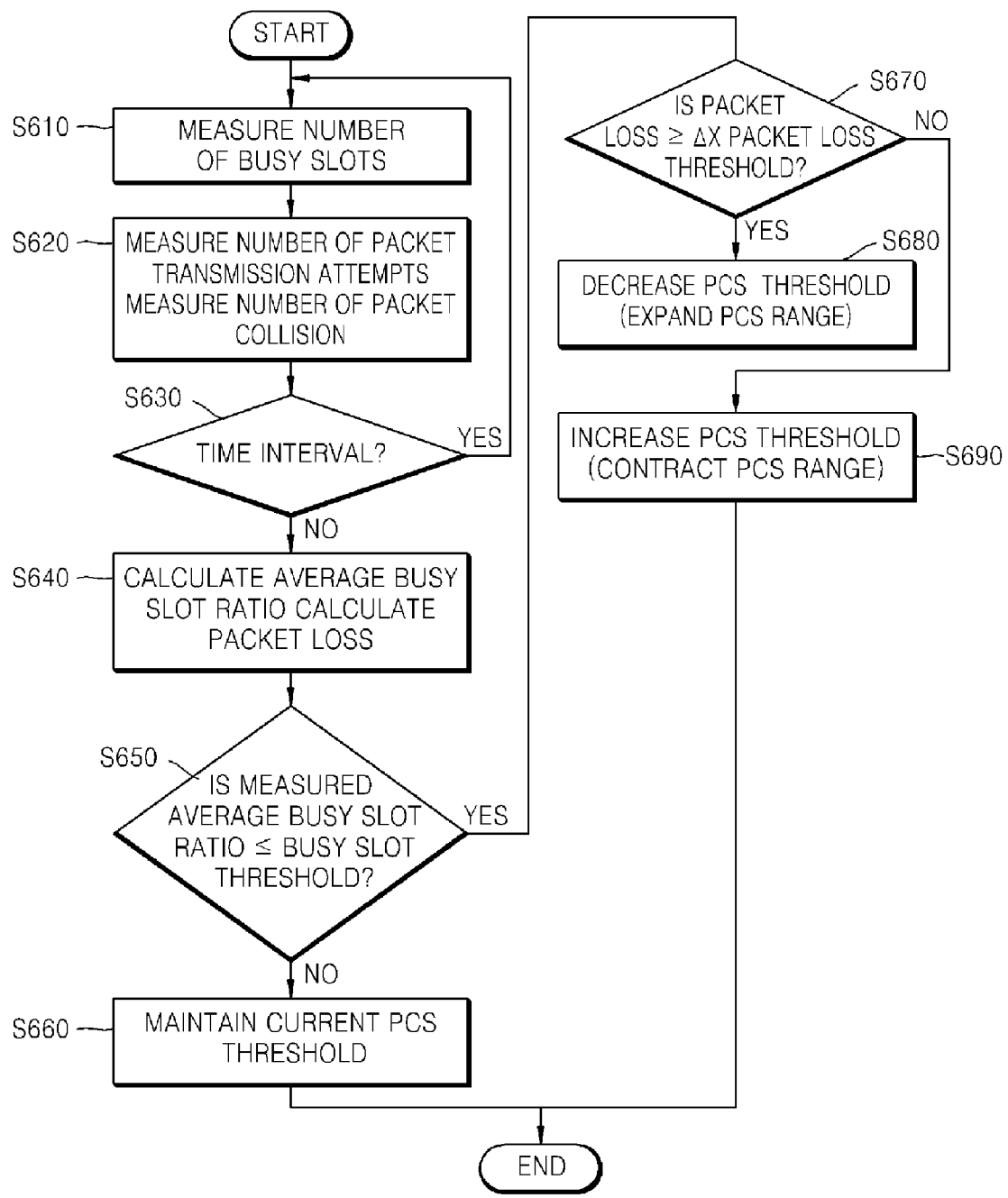
FIG. 6 is a flowchart illustrating a PCS threshold adjustment by collecting information for a predetermined period of time and measuring a congestion status of a shared channel and a packet loss, according to an embodiment of the present invention.

FIG. 6 is a flowchart illustrating a PCS threshold adjustment by collecting information for a predetermined period of time and measuring a congestion status of a shared channel and a packet loss, according to an embodiment of the present invention. FIG. 7 is an algorithm that collects information for a predetermined time period T and measures a congestion status of shared channels and a packet loss of stages shown in FIG. 6, according to an embodiment of the present invention.

First, in operation S610, the number of busy slots per contention window size $T_i$ is measured by summing the number of busy slots in proportion to a current contention window size cw_ for a time period T because the congestion of the node may be different according to the current contention window size even though the same number of busy slots is measured. For example, assume that if the cw_ is respectively 32 and 64, a cntPause is 16. Even though the cntPause is the same number 16, if the number of busy slots is measured when the backoff values are different, a ratio value such as 0.5 and 0.25 needs to be used.

In addition, the total number of packet transmission attempts $NT_i$ and the total number of packet collisions $NF_i$ are measured at every time period T in order to measure a packet loss (S620). The total number of packet transmission attempts $NT_i$ is summed whenever a transmission is attempted to a node i. In addition, the total number of packet collisions $NF_i$ is summed whenever a transmission fails when the transmitted packet is lost due to a packet collision.

As described above, the packet loss $q_i$ and average busy slot ratio $A_{T_i}$ are calculated in each of the sender nodes in order to adjust the PCS threshold based on the congestion status of the shared channel and packet loss measured for a predetermined time period T (S630) (S640).

According to the present invention, an unnecessary PCS threshold adjustment caused by congestion of a shared channel is inhibited, and thus, an overall throughput is improved. Accordingly, the PCS threshold adjustment is determined using the average busy slot ratio $A_{T_i}$ and a heuristically set busy slot threshold ($T_{th}$).

FIG. 8 is an algorithm that adjusts a PCS threshold based on a congestion status of a shared channel and a packet loss among stages shown in FIG. 6.

First, the $A_{T_i}$ and $\alpha T_{th}$ (0<α≦1) are compared (S650). Here, α is a parameter for adjusting a value used to determine channel congestion.

If $A_{T_i} > \alpha T_{th}$, the congestion status of a sender node may be regarded as a high level. In this case, frequent PCS threshold adjustments may interfere with the transmission of peripheral nodes, and thus, the PCS threshold adjustment is undesirable. Thus, if $A_{T_i} > \alpha T_{th}$, the current PCS threshold needs to be maintained constant (S660).

On the other hand, if $A_{T_i} \leq \alpha T_{th}$, a PCS threshold adjustment is determined based on a packet loss and a predetermined parameter. That is, a value obtained by multiplying a packet loss threshold ($q_{th}$) by a parameter δ is compared with a packet loss (S670).

In the current embodiment, δ is obtained by adding 1 to a weight parameter (w).

If $q_i \geq (1+w) q_{th}$ (S670), the PCS threshold is decreased in order to reduce interference of peripheral nodes generating the packet loss (S680).

Otherwise, if $q_i < (1+w) q_{th}$ (S670), the PCS threshold is increased in order to maximize a capability of space reuse to perform a concurrent transmission (S690).

The $T_{th}$, w, δ, and $q_{th}$ used herein are parameters used to adjust a PCS parameter. If inaccurate parameters are used, space reuse is not sufficiently performed, and thus, the performance of the wireless network may be decreased. Therefore, the parameters need to be accurately calculated by simulations.

For example, the weight parameter w may limit determining whether the PCS threshold is adjusted. For example, when $q_{th}=0.4$, and $w=0.1$, $q_i=0.4$, and the range of PCS threshold adjustment is limited to $0.36 \leq q_i \leq 0.44$. If the state is not changed, the current PCS threshold is maintained constant. The δ, which is a step-size parameter used to increase/decrease the PCS threshold, is also related to a convergence rate like the time period T. In addition, if the $T_{th}$ is too low, the PCS threshold of the sender node is maintained constant for a long period of time. On the other hand, if the $T_{th}$ is too high, it is not possible to detect congestion of the shared channel.

If the PCS threshold adjustment, according to the present invention, is used by accurately calculating the parameters using simulations, the reasons for the packet loss (interference of peripheral nodes or packet loss due to congestion) can be detected, and thus, the sender node can appropriately adjust the PCS threshold based on the reasons. Since unnecessary PCS threshold adjustment is inhibited, space use can be maximized in network environments frequently generating congestions and the overall network throughput can be improved.

According to the present invention, each node of the wireless mesh network adjusts the PCS threshold based on a congestion status of the shared channel and a packet loss, and thus, space use can be maximized and the overall network throughput can be improved. The PCS threshold adjustment can improve not only the overall network throughput of the wireless mesh network, but also the overall network throughput of wireless networks in which a plurality of nodes are arranged.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of adjusting a physical carrier sensing (PCS) threshold for a terminal apparatus in a wireless network, the method comprising:
    measuring, when a shared channel for transmitting data in the wireless network is not in an idle state, a congestion status of said shared channel based on a ratio between busy slots of said shared channel and idle slots of said shared channel;
    determining by the terminal apparatus, based on the measured congestion status of said shared channel, whether to adjust the PCS threshold; and
    adjusting by the terminal apparatus, when it is determined to adjust the PCS threshold, the PCS threshold based on a packet loss measured for a predetermined period of time, wherein
    the PCS threshold is a reference for determining whether said shared channel is in an idle state for use, and data transmissions are attempted during the idle slots of said shared channel and paused during the busy slots of said shared channel.

2. The method of claim 1, wherein determining whether to adjust the PCS threshold comprises:
   randomly determining a backoff period within the range of a contention window size if the shared channel is in an idle state by monitoring the shared channel;
   measuring the ratio between the busy slots and the idle slots when the state of the shared channel is changed from the idle state to a non-idle state during the backoff period; and
   calculating the congestion status of the shared channel based on the measured ratio between the busy slots and the idle slots.

3. The method of claim 2, wherein calculating the congestion status of the shared channel is performed by dividing a total number of the busy slots measured for a predetermined period of time by a total number of the idle slots measured for the same predetermined period of time to obtain an average ratio between the busy slots and the idle slots.

4. The method of claim 1, wherein the packet loss is calculated based on a total number of packet transmission attempts performed and the total number of packet transmission failures for a predetermined period of time.

5. The method of claim 1, wherein adjusting the PCS threshold comprises increasing or decreasing the PCS threshold by an adjustable step-size parameter determined by a simulation.

6. The method of claim 1, further comprising transmitting data when the shared channel is in an idle state by determining whether the shared channel is an idle state for transmitting data, based on the size of a signal received from the wireless network and the PCS threshold.

7. A terminal apparatus for a wireless network, comprising:
   an adjustment determining unit which measures, when a shared channel for transmitting data in the wireless network is not in an idle state, a congestion status of said shared channel based on a ratio between busy slots of said shared channel and idle slots of said shared channel, and determines based on the measured congestion status of said shared channel, whether to adjust a physical carrier sensing (PCS) threshold; and
   a PCS threshold adjusting unit which adjusts, when it is determined to adjust the PCS threshold, the PCS threshold based on a packet loss measured for a predetermined period of time, wherein
   the PCS threshold is a reference for determining whether said shared channel is in an idle state for use, and
   data transmissions are attempted during the idle slots of said shared channel and paused during the busy slots of said shared channel.

8. The terminal apparatus of claim 7, further comprising:
   a channel state detecting unit which determines whether the shared channel is an idle state for transmitting data, based on the size of a signal received from the wireless network and the PCS threshold; and
   a data transmitting unit which transmits data when the shared channel is in an idle state.

9. The terminal apparatus of claim 7, wherein the adjustment determining unit measures the congestion status of the shared channel based on the measured ratio between the busy slots and the idle slots when the state of the shared channel is changed from the idle state to a non-idle state during the backoff period which is randomly determined within the range of a contention window size if the shared channel is in an idle state by monitoring the shared channel.

10. The terminal apparatus of claim 9, wherein the adjustment determining unit measures an average ratio between the busy slots and the idle slots by dividing a total number of busy slots measured for a predetermined period of time by a total number of the idle slots for the same period of time.

11. The terminal apparatus of claim 7, wherein the packet loss is calculated based on a total number of packet transmission attempts performed for a predetermined period of time and a total number of packet transmission failures.

12. The terminal apparatus of claim 7, wherein the PCS adjustment unit increases or decreases the PCS threshold by an adjustable step-size parameter determined by a simulation.

* * * * *